UNITED STATES PATENT OFFICE.

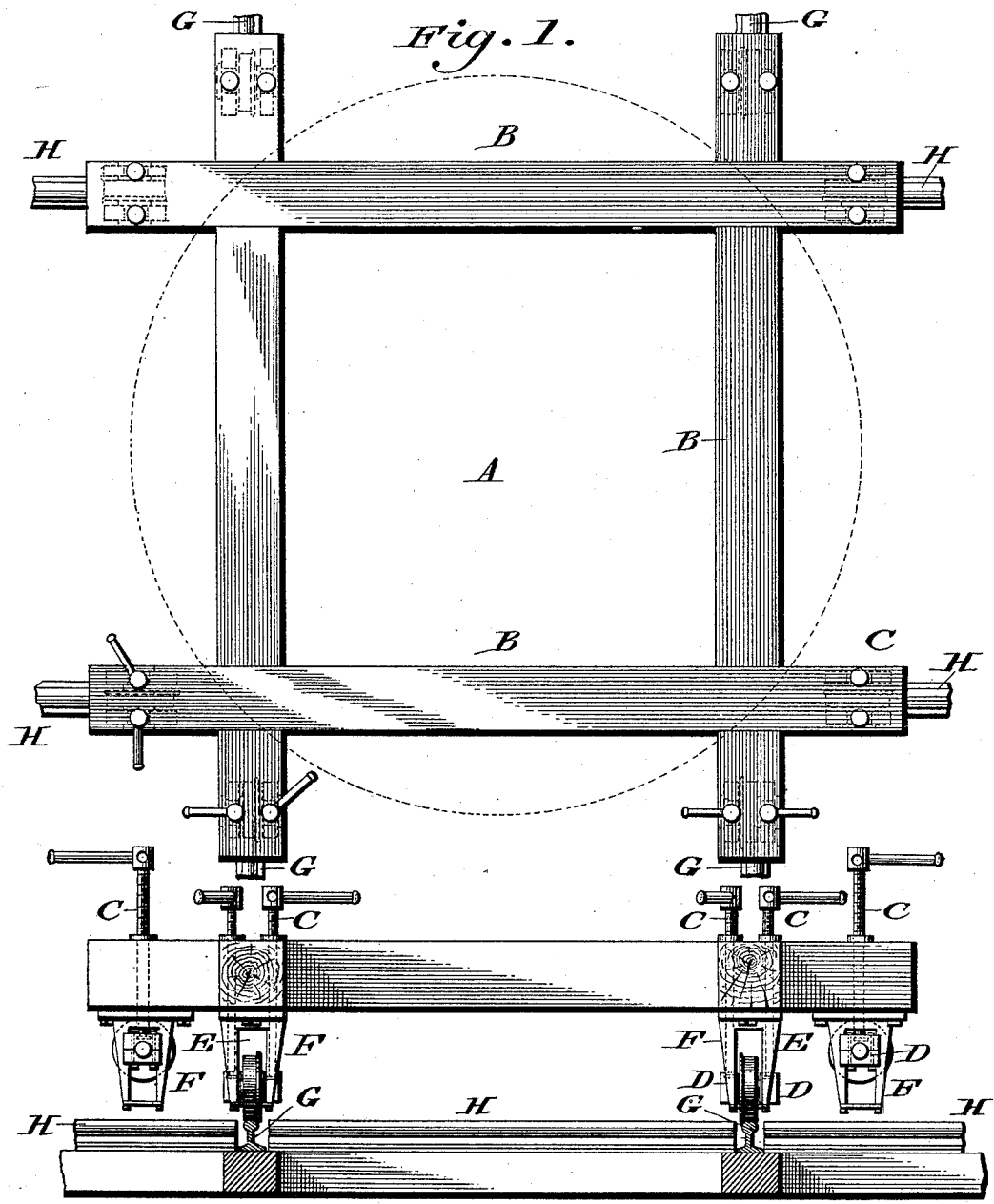

LYMAN D. HOWARD, OF PHILADELPHIA, PENNSYLVANIA, ASSIGNOR TO THE CLARK-HOWARD EXCAVATOR AND CONVEYOR COMPANY, OF NEW JERSEY.

TRUCK-TRANSFERRING DEVICE.

SPECIFICATION forming part of Letters Patent No. 413,063, dated October 15, 1889.

Application filed March 15, 1889. Serial No. 303,388. (No model.)

*To all whom it may concern:*

Be it known that I, LYMAN D. HOWARD, a citizen of the United States, residing in the city and county of Philadelphia, State of Pennsylvania, have invented a new and useful Improvement in Truck-Transferring Devices for Coal and other Elevators, which improvement is fully set forth in the following specification and accompanying drawings.

My invention consists of a truck, more particularly for the tower of an elevator, provided with means for the transfer of the truck to tracks at an angle thereto.

Figure 1 represents a top or plan view of a truck-transferring device embodying my invention. Fig. 2 represents a side elevation thereof.

Similar letters of reference indicate corresponding parts in the two figures.

Referring to the drawings, A designates the truck on which is supported the tower of an elevator for coal, &c., said tower being represented by the dotted circle, Fig. 1.

B designates the beams or sills of the truck, the same crossing each other and having fitted to each end the vertical screws C, whose lower ends are swiveled to the boxes D of the journals of the car or truck wheels E, said boxes being loosely connected with the pedestals F, so as to rise and lower thereon. It will be seen that the pedestals of each corner extend at a right angle to each other, so that the wheels E may be fitted on either of the rails of the cross-tracks G H.

The truck is represented as resting on the rails G; but when it is desired to place the same on the rails H the wheels over the latter are lowered by proper operation of the screws above the same until said wheels are in contact with the rails. The wheels over the rails G are now raised clear of the same, whereby the truck is supported by the wheels on the rails H and may be run on the latter, which, in the present case, are at a right angle to the rails G.

From the above description it will be readily understood how the truck may be afterward devised to run on the rails G.

Having thus described my invention, what I claim as new, and desire to secure by Letters Patent, is—

1. An elevator-truck provided with two sets of wheels at an angle to each other and means for raising and lowering them, combined and operating substantially as described.

2. A truck provided with two sets of wheels at an angle to each other, boxes bearing said wheels, pedestals containing said boxes, and screws connected with the boxes for raising and lowering the same, the parts being combined substantially as described.

LYMAN D. HOWARD.

In presence of—
HENRY G. WILEY,
F. W. SHELDON.